US008305197B2

(12) United States Patent
Yamamoto et al.

(10) Patent No.: US 8,305,197 B2
(45) Date of Patent: Nov. 6, 2012

(54) ARTICLE MANAGEMENT SYSTEM, AND PORTABLE APPARATUS FOR COMMUNICATING WITH RFID TAG

(75) Inventors: Kazutaka Yamamoto, Nagoya (JP);
Yasuhisa Ichikawa, Nagoya (JP);
Mitsuru Nakamura, Kasugai (JP);
Hiroshi Oida, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 868 days.

(21) Appl. No.: 12/383,670

(22) Filed: Mar. 27, 2009

(65) Prior Publication Data
US 2009/0256672 A1  Oct. 15, 2009

(30) Foreign Application Priority Data
Apr. 9, 2008  (JP) .................................. 2008-101317

(51) Int. Cl.
*H04Q 5/22* (2006.01)
(52) U.S. Cl. ..................................................... 340/10.4
(58) Field of Classification Search ................ 340/10.4, 340/3.1, 5.6, 10.5, 13.26, 505
See application file for complete search history.

(56) References Cited

U.S. PATENT DOCUMENTS

| | | | | | |
|---|---|---|---|---|---|
| 5,886,634 | A | * | 3/1999 | Muhme | 340/572.1 |
| 6,354,493 | B1 | * | 3/2002 | Mon | 235/380 |
| 6,496,806 | B1 | * | 12/2002 | Horwitz et al. | 705/28 |
| 6,669,089 | B2 | * | 12/2003 | Cybulski et al. | 235/385 |

FOREIGN PATENT DOCUMENTS

| | | |
|---|---|---|
| JP | 11205202 A | 7/1999 |
| JP | 2001052054 A | 2/2001 |
| JP | 2001-126442 | 5/2001 |
| JP | 2003-160209 | 6/2003 |
| JP | 2007-087034 | 4/2007 |

* cited by examiner

*Primary Examiner* — Vernal Brown
(74) *Attorney, Agent, or Firm* — McCarter & English, LLP

(57) ABSTRACT

An article management system 1 comprising a handheld reader having a reader antenna for transmitting and receiving information with RFID tags and configured to search for a plurality of article tags respectively provided to a plurality of printers, and a database connected in an information transmittable and receivable manner to the handheld reader, wherein: the database stores in association the article name of each printer, management status information, and corresponding article tag ID; and the handheld reader performs a step of scanning an article tag ID from the article tag, a step of issuing a primary notification based on vibration to a user when the article tag ID is received, and a step of issuing a secondary notification based on sound generation to the user when a cross-check of the scanned tag ID and the article tag ID that is the search target results in a match.

8 Claims, 13 Drawing Sheets

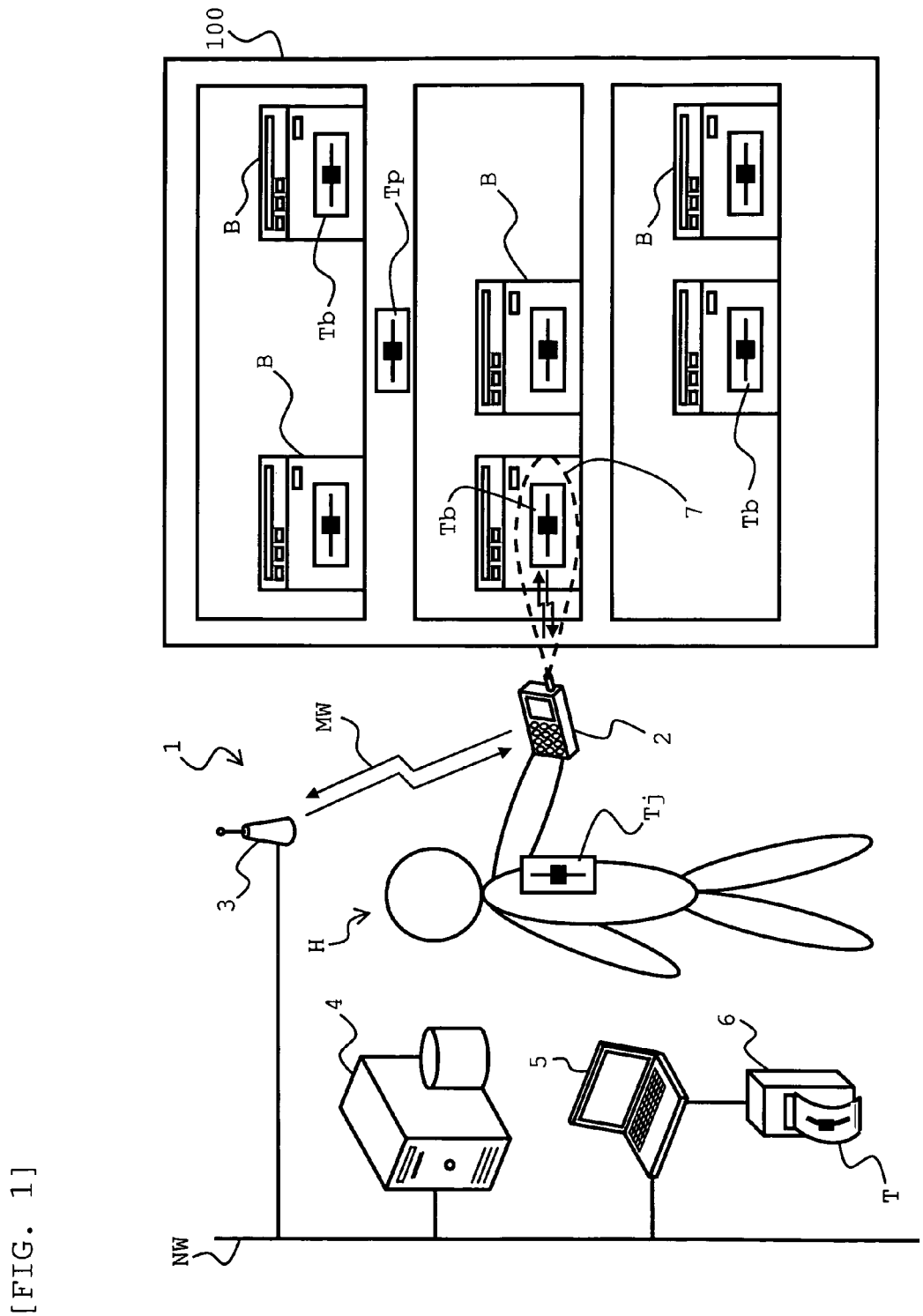
[FIG. 1]

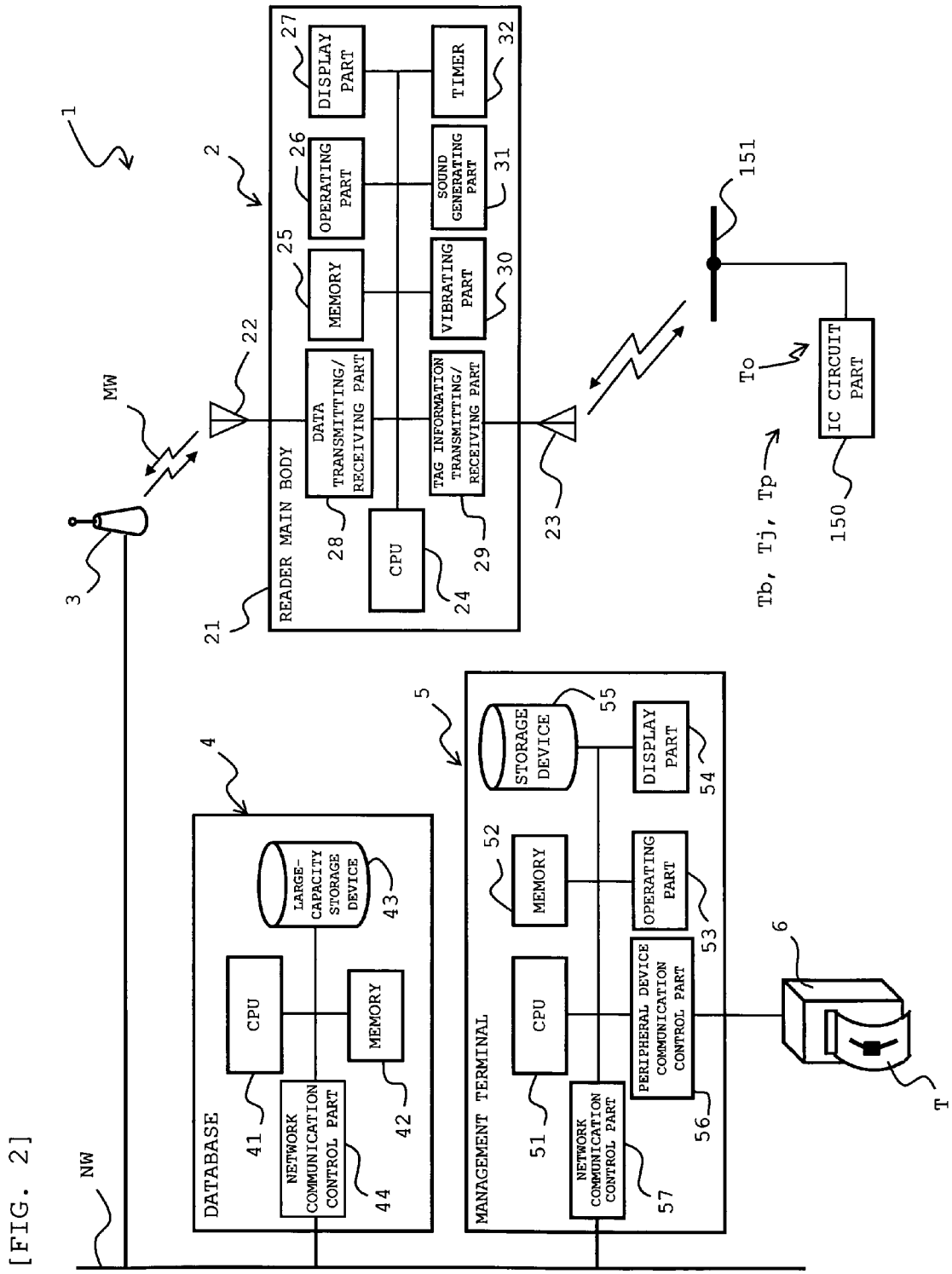
[FIG. 2]

[FIG. 3]
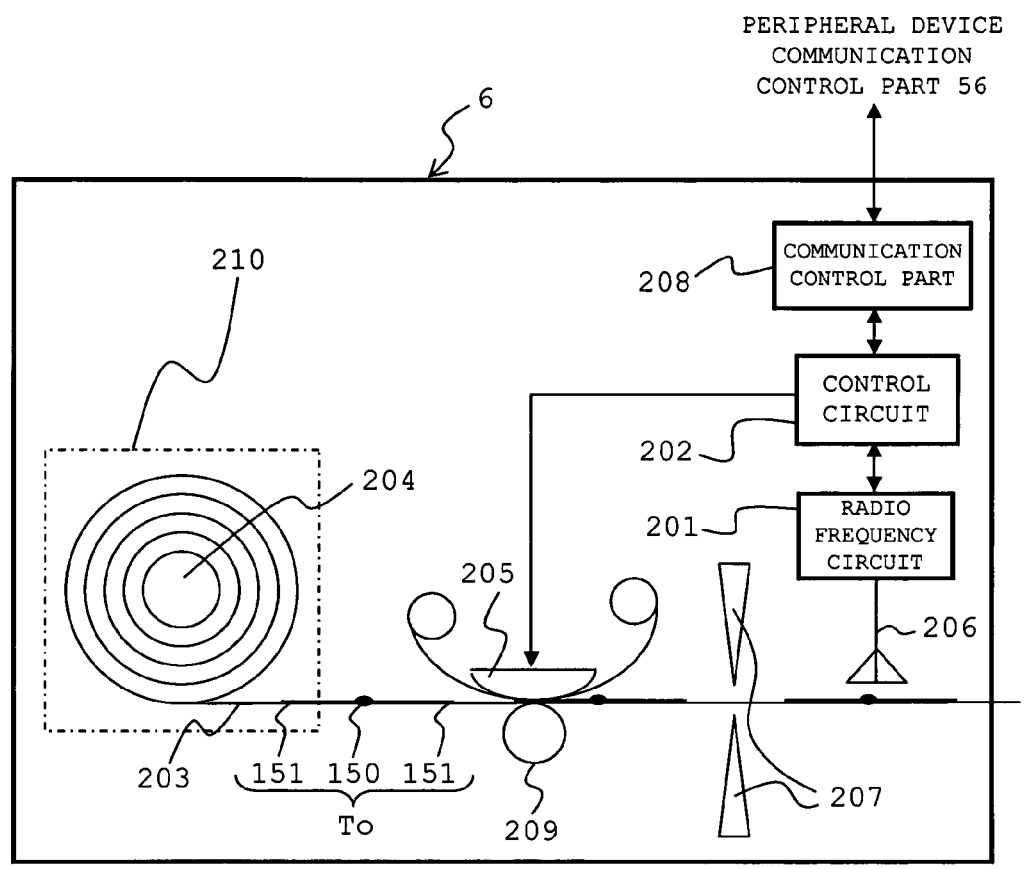

[FIG. 4]
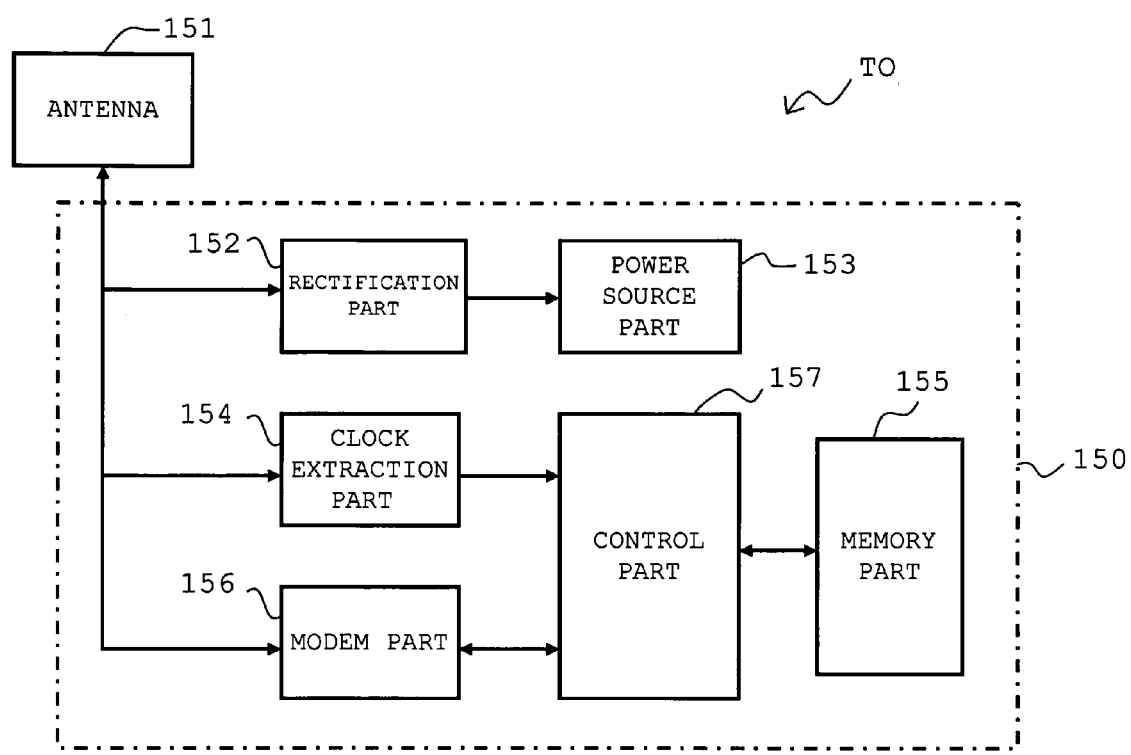

[FIG. 5A]

ARTICLE MANAGEMENT TABLE

| ARTICLE NAME | ARTICLE TAG ID | STORAGE LOCATION TAG ID | MANAGEMENT STATUS | TAKE-OUT USER TAG ID |
|---|---|---|---|---|
| TRIAL MANUFACTURE PRINTER(Ver.0.5) | 800001C3 | C0000006 | STORED | — |
| TRIAL MANUFACTURE PRINTER(Ver.0.8) | 8000064A | C0000006 | TAKEN OUT | E0000034 |
| EVALUATION PRINTER (Ver.1.1) | 80000B02 | C0000006 | STORED | — |
| EVALUATION PRINTER(Ver.1.5) | 80001026 | C0000007 | STORED | — |
| EVALUATION PRINTER(Ver.2.1) | 800012E5 | C0000007 | TAKEN OUT | E000001D |
| . . | . . | . . | . . | . . |

[FIG. 5B]

USER MANAGEMENT TABLE

| USER TAG ID | AFFILIATED DEPARTMENT | NAME | TAKE-OUT PERMISSIBILITY |
|---|---|---|---|
| E0000001 | CONTROL DEPT. | SUZUKI | PERMITTED |
| E0000002 | DEVELOPMENT DEPT. | TANAKA | PERMITTED |
| E0000003 | PLANNING DEPT. | SATO | NOT PERMITTED |
| . . | . . | . . | . . |

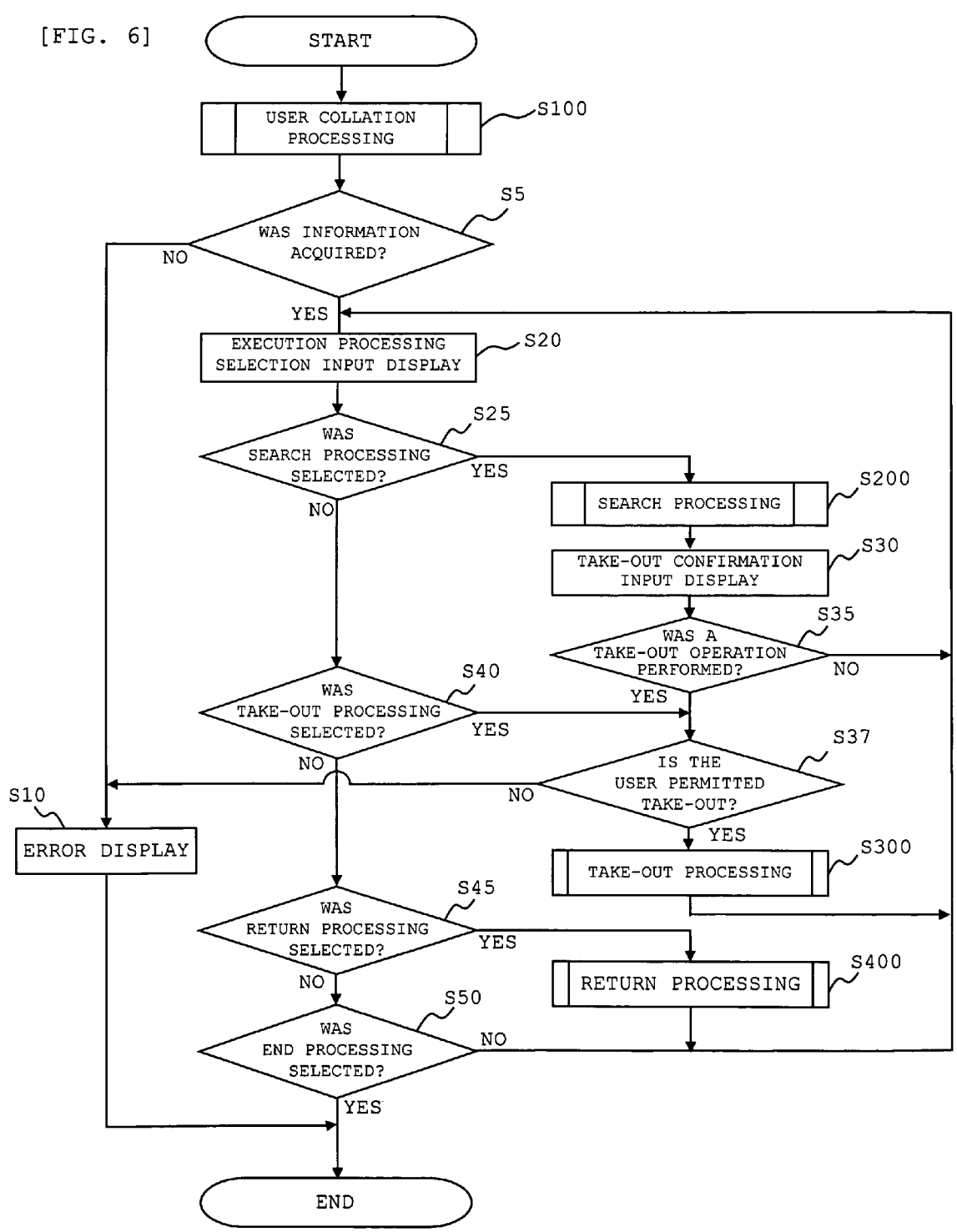
[FIG. 6]

[FIG. 7]
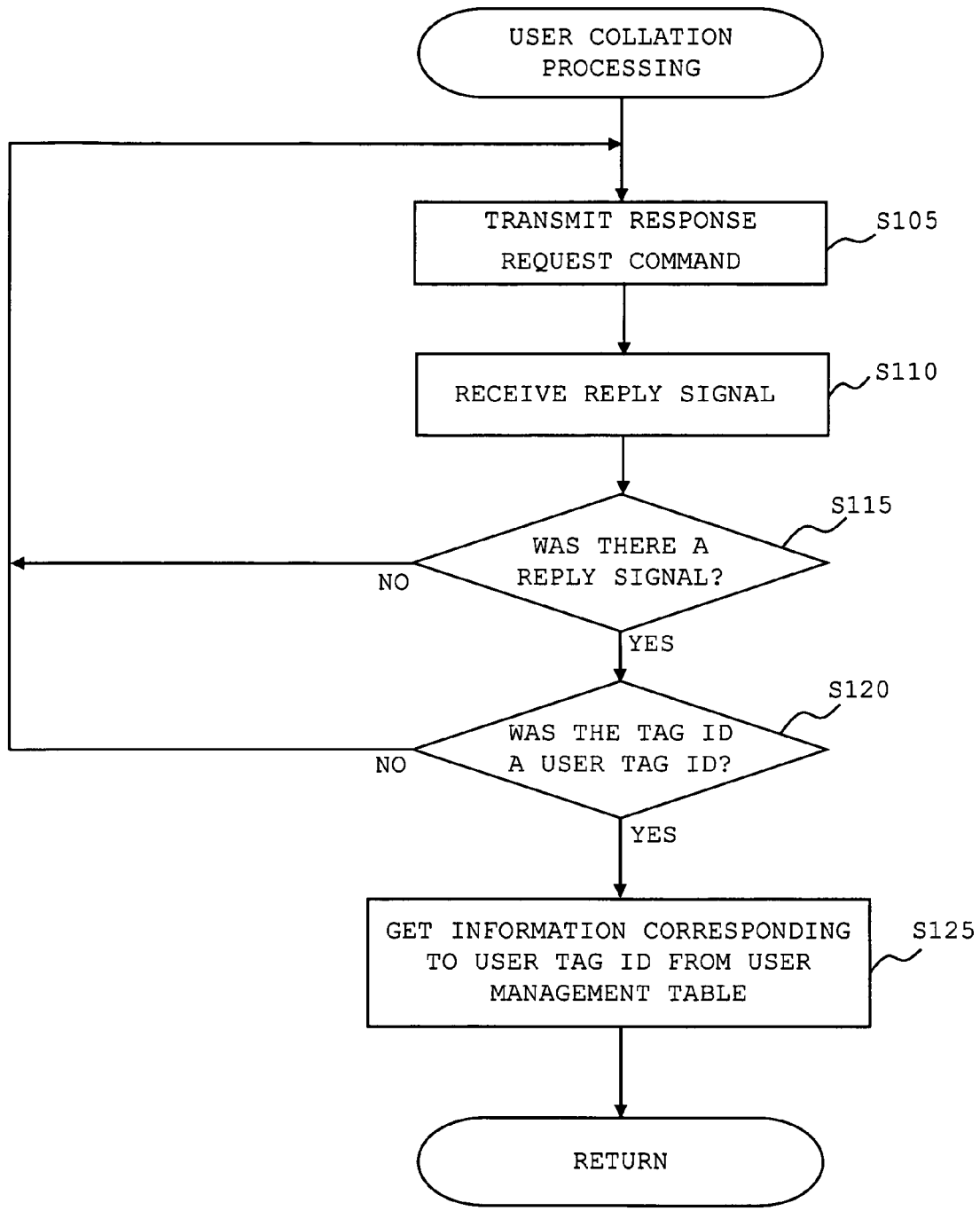

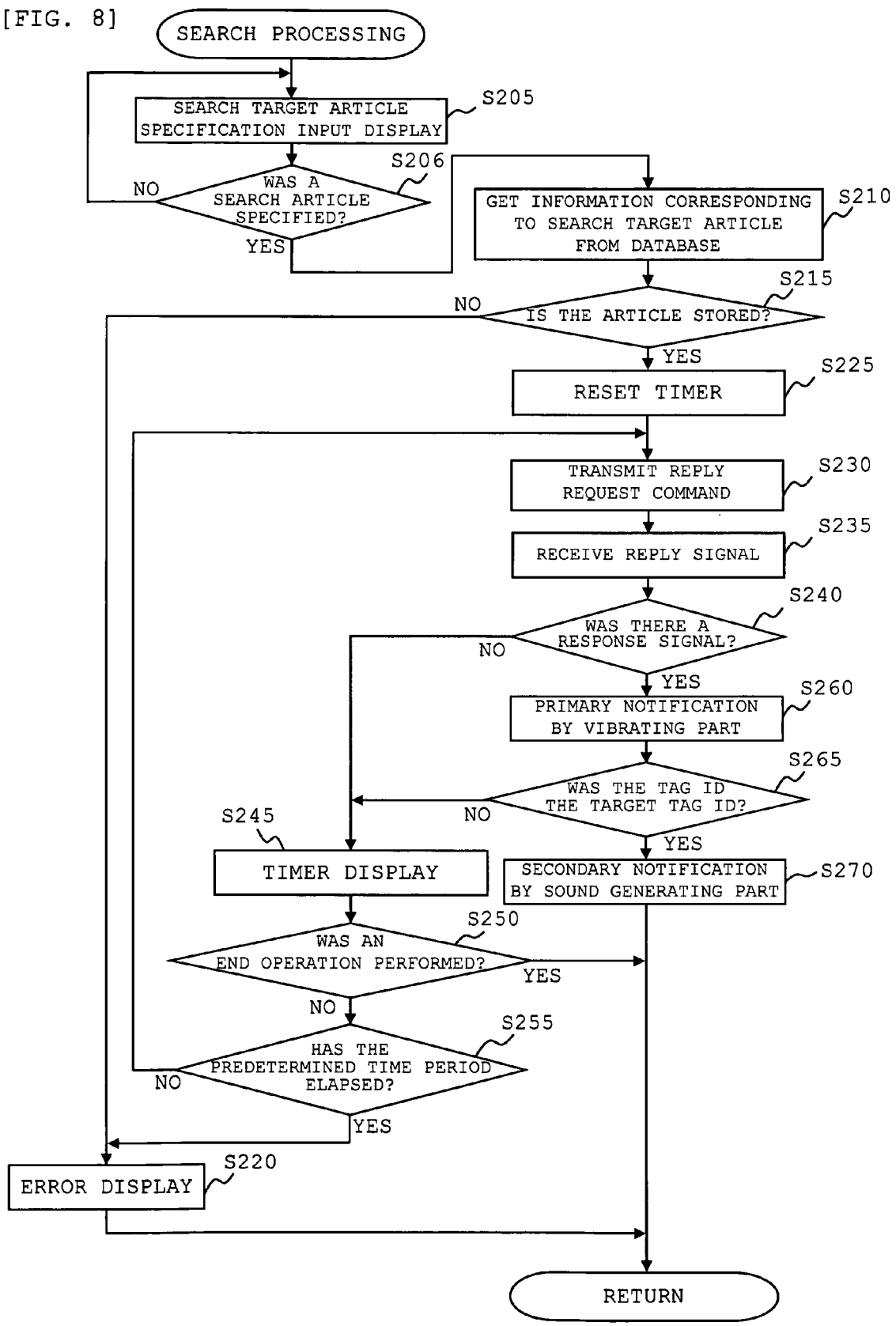
[FIG. 8]

[FIG. 9]
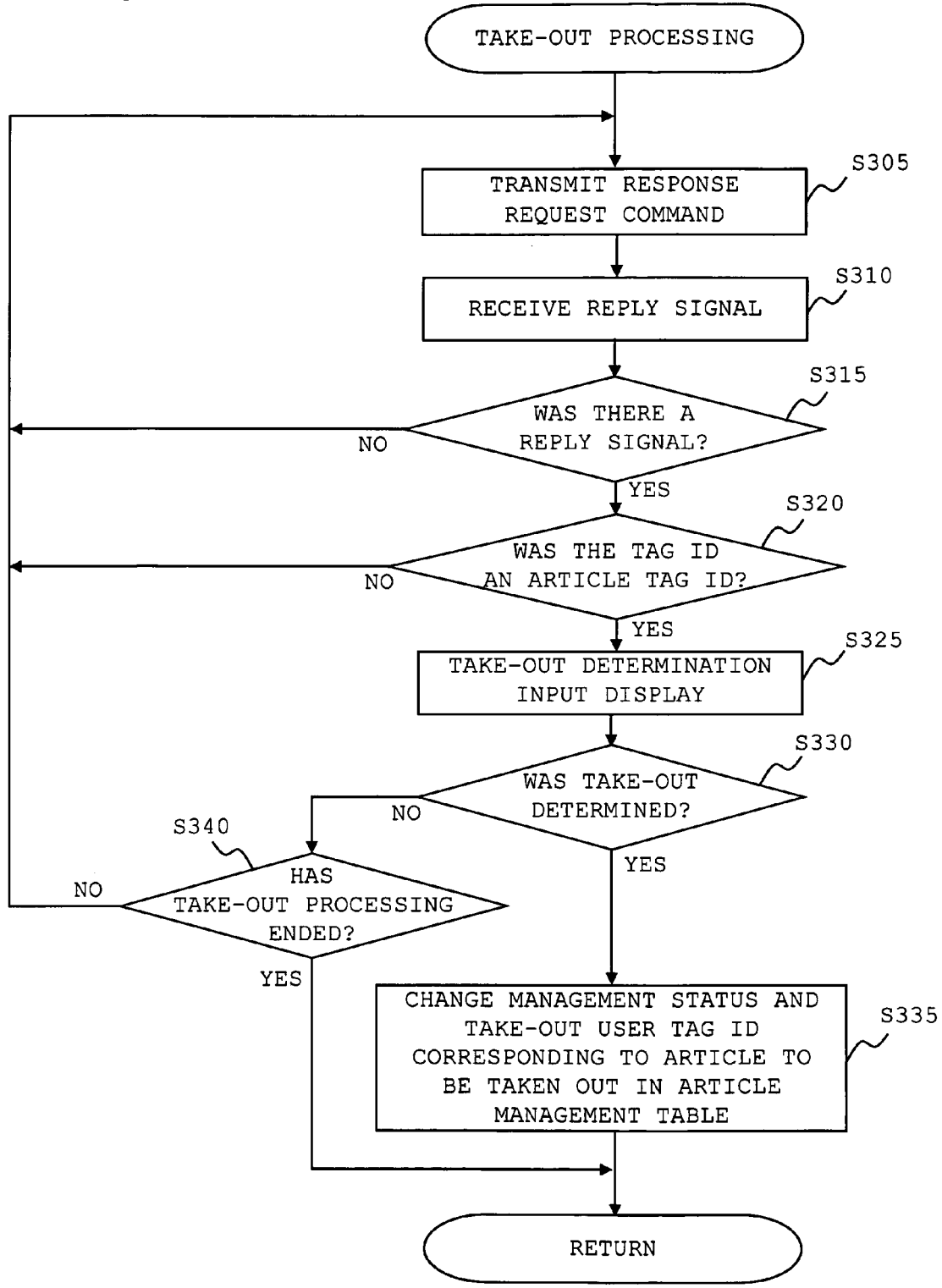

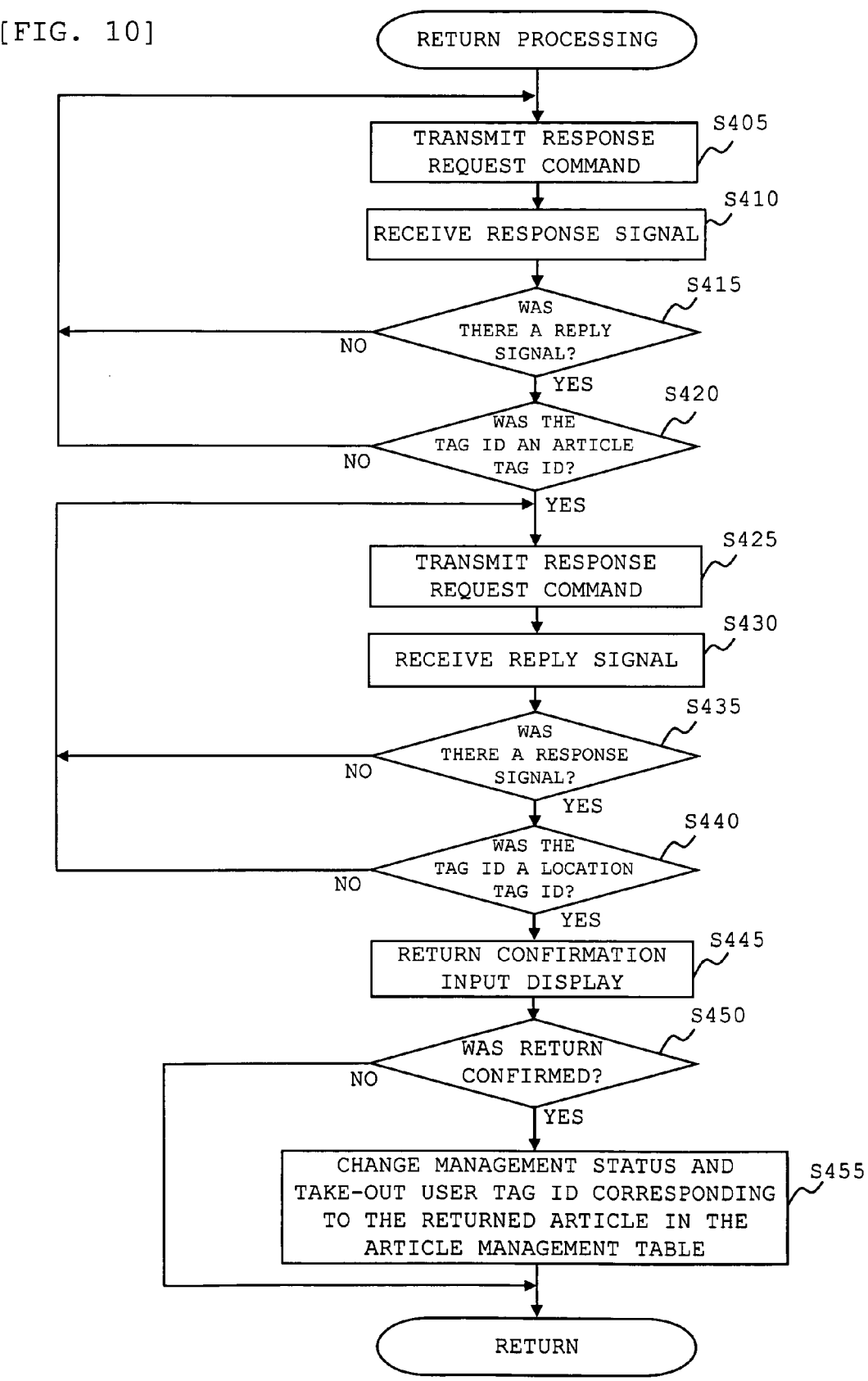
[FIG. 10]

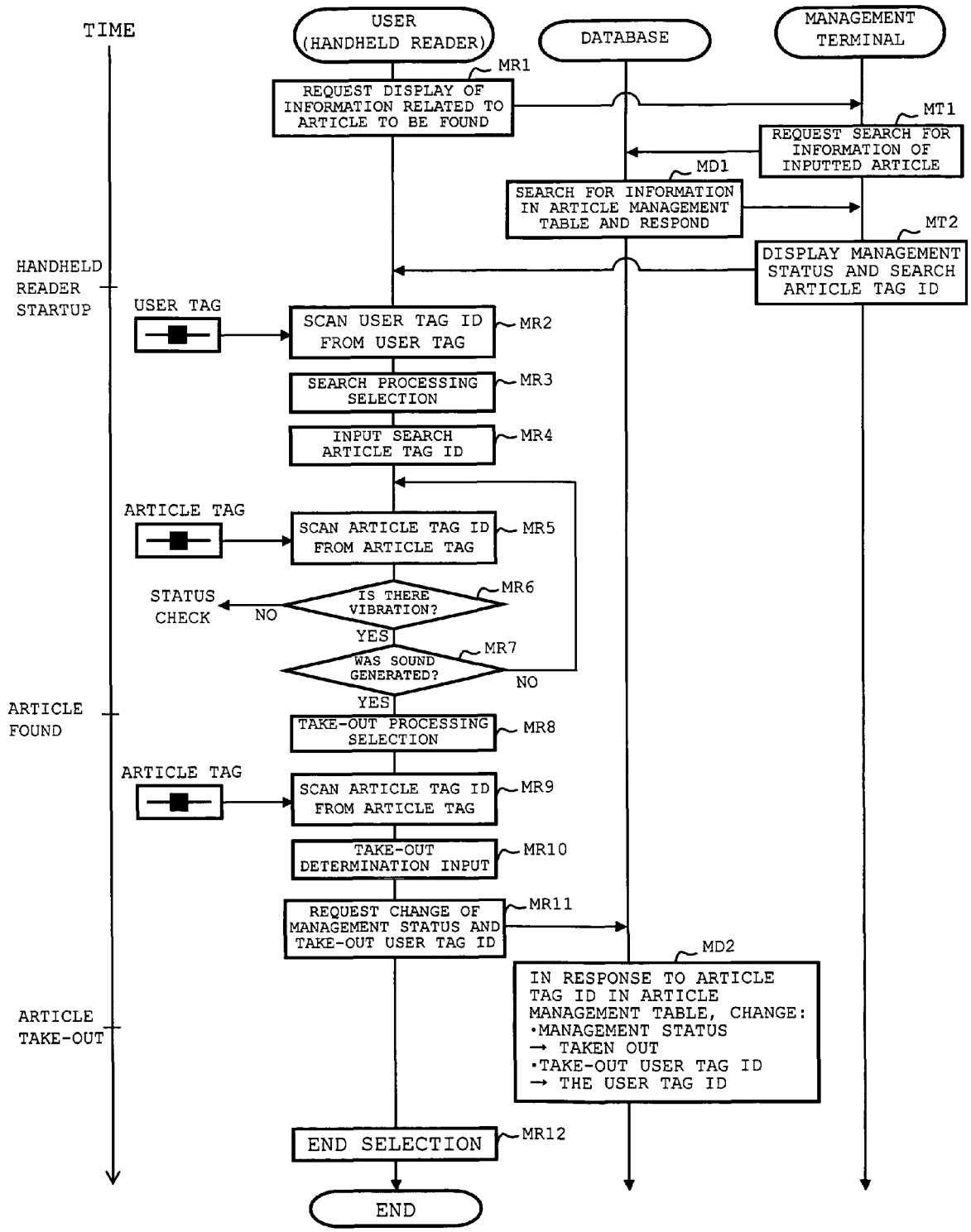
[FIG. 11]

[FIG. 12]
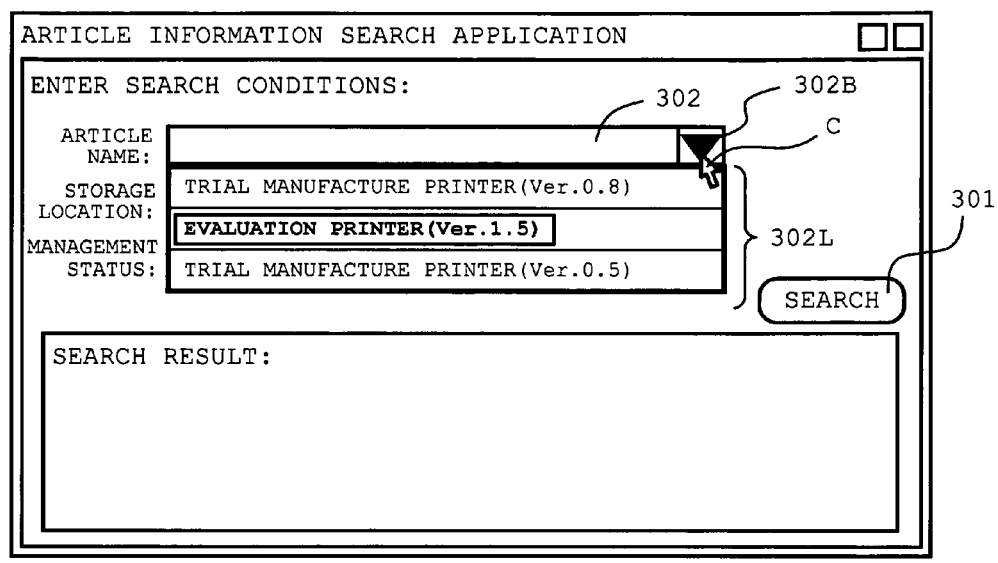

[FIG. 13]
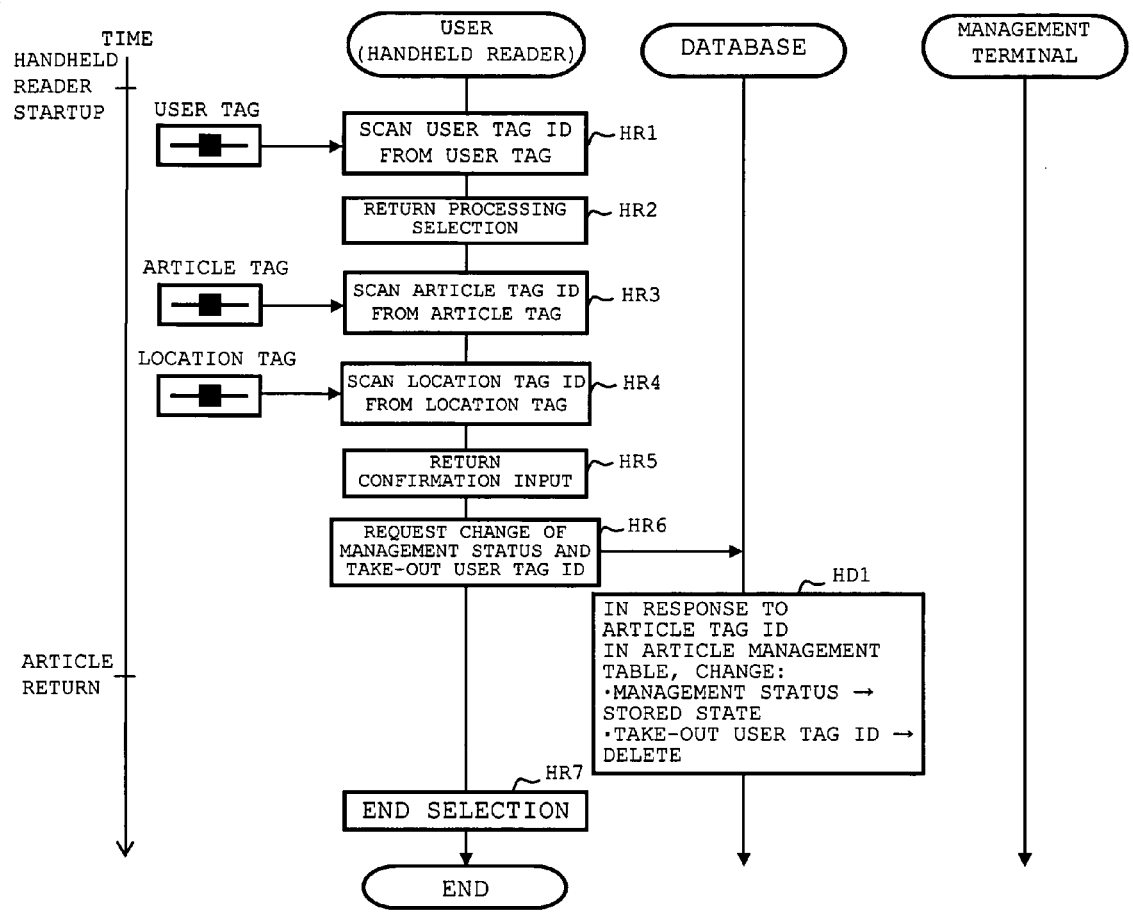

ARTICLE MANAGEMENT SYSTEM, AND PORTABLE APPARATUS FOR COMMUNICATING WITH RFID TAG

CROSS-REFERENCE TO RELATED APPLICATIONS

This application claims priority from JP 2008-101317, filed Apr. 9, 2008, the contents of which are hereby incorporated by reference.

BACKGROUND OF THE INVENTION

1. Field of the Invention

The present invention relates to an article management system configured to manage articles by reading information held in a RFID tag provided to each managed article, and a portable apparatus for communicating with a RFID tag configured to use this article management system.

2. Description of the Related Art

A small-sized RFID tag capable of transmitting and receiving information with an external source is often provided to an article so that article searches and article management can be performed. A RFID circuit element provided to a RFID tag comprises an IC circuit part configured to store information and a tag antenna configured to transmit and receive information, and is capable of transmitting and receiving information in a non-contact manner with an apparatus for communicating with a RFID tag. The respective identification information is provided to each RFID circuit element, and a RFID circuit element that receives an inquiry signal from the apparatus for communicating with a RFID tag returns a reply signal that includes the identification information to the apparatus for communicating with a RFID tag.

One known example of such an article management system is the system described in JP, A, 1999-205202. In this prior art, each bottle of spirits that has been purchased by a customer at a restaurant and is to be kept for that customer at the restaurant is established as a managed article, and each such bottle is provided with a RFID tag (IC tag). When a customer who has purchased such a bottle arrives at the restaurant, the restaurant staff enters the name of the customer into a portable apparatus for communicating with a RFID tag (a reader/writer). As a result, an inquiry signal that includes the identification information of the RFID circuit element corresponding to the customer name, etc., is outputted. The staff then consecutively holds the apparatus over the kept group of bottles. At this time, the RFID tag of each bottle determines whether or not the identification information included in the inquiry signal matches its own information and, when the identification information does match its own, makes a notification (light emission from a fluorescent diode) to the staff accordingly by a notifying device provided to the RFID tag. As a result, when the portable apparatus for communicating with a RFID tag is consecutively held over each bottle in this manner, all bottles other than the bottle kept for that customer do not respond while the bottle kept for that customer emits a light in response to its own identification information, making it possible for the staff to quickly find the target bottle.

Nevertheless, the above-described prior art has the following problems.

That is, the RFID tag provided to the managed article (bottle) that is the search target may fail for some reason or other or have communication difficulties due to the displaced orientation of the managed article or the surrounding radio wave environment. In such a case, when the portable apparatus for communicating with a RFID is held over the managed article that is the search target as described above, the RFID circuit element does not respond and the above-described notification is not made. As a result, the operator does not recognize that the managed article was the search target. Further, in such a case, no notification is made from any of the managed articles even when the portable apparatus for communicating with a RFID tag is used on all managed articles. The staff must therefore find the managed article that is the search target by, for example, visually inspecting all managed articles, resulting in a substantial amount of labor.

SUMMARY OF THE INVENTION

It is therefore an object of the present invention to provide an article management system capable of reliably finding a managed article that is a search target even in a case where communication failure occurs in a RFID circuit element, and a portable apparatus for communicating with a RFID tag configured to use this article management system.

BRIEF DESCRIPTION OF THE DRAWING

FIG. 1 is a diagram showing an example of a case where an article management system of an embodiment of the present invention is applied to storage management of articles stored on a storage shelf.

FIG. 2 is a functional block diagram illustrating the detailed functions of a handheld reader, database, and management terminal of the article management system.

FIG. 3 is a functional block diagram illustrating the detailed functions of the apparatus for producing a RFID tag.

FIG. 4 is a functional block diagram illustrating an example of the functional configuration of a RFID circuit element provided to the RFID tag.

FIG. 5A is a diagram conceptually showing an example of an article management table, and FIG. 5B is a diagram conceptually showing an example of a user management table.

FIG. 6 is a flowchart illustrating a control procedure executed by the CPU of the handheld reader.

FIG. 7 is a flowchart illustrating the detailed procedure of the user collation processing executed in step S100 in FIG. 6.

FIG. 8 is a flowchart illustrating the detailed procedure of the search processing executed in step S200 in FIG. 6.

FIG. 9 is a flowchart illustrating the detailed procedure of the take-out processing executed in step S300 in FIG. 6.

FIG. 10 is a flowchart illustrating the detailed procedure of the return processing executed in step S400 in FIG. 6.

FIG. 11 is a sequence diagram showing an example of the control operation and response following the search processing and take-out processing performed using the handheld reader.

FIG. 12 is a diagram showing a display example of the display part of the management terminal when a search is conducted in step MR1 of FIG. 11.

FIG. 13 is a sequence diagram showing an example of the control operation and response when return processing is performed using the handheld reader.

DETAILED DESCRIPTION OF THE PREFERRED EMBODIMENTS

The following describes an embodiment of the present invention with reference to accompanying drawings.

FIG. 1 shows an example of a case where an article management system of the present embodiment is applied to storage management of articles stored on a storage shelf, for example.

In FIG. 1, an article management system 1 manages the storage status of articles stored on a storage shelf 100 having three shelves arranged lengthwise in this example, and is configured to search for a target article. The managed articles (articles subject to management) stored in this example include a plurality of printers B produced for trial manufacture and for evaluation, etc. Each printer B has a different internal structure and different program stored in memory, etc., and is therefore individually classified, but the outer appearance is substantially the same, making it difficult to visually identify a specific unit.

An article tag Tb that stores an article tag ID (tag identification information) as identification information in a RFID circuit element To described later is affixed to each printer B. A location tag Tp that stores a location tag ID as identification information of a storage location in a RFID circuit element To described later is affixed to the storage shelf 100. A user (operator, searcher) H has a user tag Tj that stores a user tag ID (user identification information) as identification information of the user H in a RFID circuit element To described later.

Then, as shown in FIG. 1, the article management system 1 comprises a handheld reader (portable apparatus for communicating with a RFID tag) 2 carried by the user H and configured to scan the respective tag IDs from the article tag Tb, the location tag Tp, and the user tag Tj (hereinafter suitably and simply referred to as "RFID tag T" in general), a radio access point 3 capable of transmitting and receiving information and instruction signals via a radio network (radio communication line) MW of a radio LAN, etc. with the handheld reader 2, a database 4 capable of transmitting and receiving information and instruction signals via a wired network (wired communication line) NW of a wired LAN, etc. with the radio access point 3, a management terminal (search terminal) 5 capable of transmitting and receiving information and instruction signals with the database 4 via the same wired network NW, and an apparatus 6 for producing a RFID tag that is directly connected to the management terminal 5 and is capable of producing the article tag Tb, the location tag Tp, and the user tag Tj in this example.

The article tag Tb, the location tag Tp, and the user tag Tj are each capable of radio communication with the handheld reader 2, and the user H scans each tag ID from the target RFID tag T positioned in a predetermined communication range 7 from a reader antenna 23 (described later in FIG. 2) of the handheld reader 2. The various information corresponding to the scanned tag ID is then acquired from the database 4, making it possible to manage the storage status of the printer B.

FIG. 2 is a functional block diagram illustrating the detailed functions of the handheld reader 2, the database 4, and the management terminal 5 of the article management system 1.

In FIG. 2, the handheld reader 2 comprises a reader main body 21, a main antenna 22 for performing radio communication via the radio access point 3, and the reader antenna (apparatus antenna) 23 for performing radio communication with the RFID tag T.

The reader main body 21 comprises a CPU (central processing unit) 24, a memory 25 comprising RAM or ROM for example, an operation part 26 by which instructions and information from the system administer are entered, a display part (time information display device, confirmation display device) 27 configured to display various information and messages, a data transmitting and receiving part 28 configured to transmit and receive sound signals and data signals of a call via the main antenna 22, a tag information transmitting and receiving part 29 configured to scan the tag ID from the RFID tag T via the reader antenna 23, a vibrating part (vibrating notifying device, primary notifying device) 30 configured to generate vibration for notification in the handheld reader 2, a sound generating part (sound notifying device, secondary notifying device) 31 configured to generate a sound for notification such as a beep for example, and a timer (timer device) 32 for measuring time. The CPU 24 processes signals in accordance with a program stored in advanced in ROM while utilizing a temporary storage function of RAM, thereby transmitting and receiving various information signals between the RFID tag T and the database 4, and controlling the basic operation of each part of the handheld reader 2.

The CPU 24 processes the signal read from the IC circuit part 150 of the RFID circuit element To so as to read the information, and generates a response request command for accessing the IC circuit part 150 of the RFID circuit element To.

The reader antenna 23, for example, is configured so as to be formed with sharp directivity, that is, so that the communication range 7 has a narrow width and narrow and long main lobe direction (for example, so that the main lobe direction matches the longitudinal direction of the housing of the handheld reader 2). With this arrangement, the handheld reader 2 is designed so as to perform radio communication with the RFID tag T that exists near a line extended in the longitudinal direction from the housing (refer to FIG. 1).

The tag information transmitting and receiving part 29 is for accessing the information (RFID tag information, including the tag ID) of the IC circuit part 150 of the RFID circuit element To via the reader antenna 23.

The database 4 comprises a CPU 41, a memory 42, a large-capacity storage device 43 comprising a hard disk device and configured to store various information, and a network communication control part 44 configured to control the reception of information signals with the radio access point 3 and the management terminal 5 via the wired network NW.

The management terminal 5 is made of a so-called general-purpose computer, and comprises a CPU 51, a memory 52, an operation part (operation device) 53, a display part 54, a storage device 55 comprising a hard disk device, a peripheral device communication control part 56 configured to control the reception of signals with the apparatus 6 for producing a RFID tag (for details, refer to FIG. 3 described later), and a network communication control part 57 configured to control reception of information signals with the database 4 via the wired network NW.

While the handheld reader 2 is shown in this example as connected with the radio access point 3 and the wired network NW via the radio network MW of a radio LAN, etc., the present invention is not limited thereto and may comprise a network communication control part in the handheld reader 2 and be directly connected to the wired network NW.

The RFID tag T comprises the RFID circuit element To comprising a tag antenna 151 and an IC circuit part 150, and this RFID circuit element To is provided to a base (not shown), etc. (The RFID circuit element To will be described later.)

FIG. 3 is a functional block diagram illustrating the detailed functions of the apparatus 6 for producing a RFID tag.

In FIG. 3, the apparatus 6 for producing a RFID tag has a holder part 210 of a roll of a tape with RFID tags, which is capable of detachably mounting a roll 204 of a tape with RFID tags around which a tag tape (actually spiral in shape, but simply shown in a concentric shape in the figure for the sake of convenience) 203 in which the RFID circuit element To is provided at a predetermined interval is wound (or capable of detachably mounting a cartridge comprising the roll 204 of a tape with RFID tags), a print head 205 configured to print desired print in an area of the tag tape 203 fed out from this roll 204 of a tape with RFID tags that corresponds to the RFID circuit element To, an apparatus antenna 206 configured to transmit and receive information by radio communication with the RFID circuit element To, a communication control part 208 configured to control the communication performed between a radio frequency circuit 201, a control circuit 202, and the peripheral device communication control part 56 of the management terminal 5, a cutter 207 configured to cut at a predetermined length the tag tape 203 on which print has been printed and writing to the RFID circuit element To has been completed so as to form the RFID tag T, and a feeding apparatus 209 provided opposite the print head 205 and controlled by the control circuit 202 so as to feed the roll 204 of a tape with RFID tags.

The radio frequency circuit 201 and the control circuit 202 generate information for accessing the IC circuit part 150 of the RFID circuit element To and transmit the generated information to the RFID circuit element To via the apparatus antenna 206, or input the access information received via the tag antenna 151 to the IC circuit part 150 with the RFID circuit element To. In this manner, information reading and information writing are performed with the IC circuit part 150. Further, the control circuit 202 is connected to the management terminal 5 via the communication control part 208, and is capable of transmitting and receiving information with this management terminal 5.

With such a configuration, when the RFID tag T is to be produced using the apparatus 6 for producing a RFID tag, the user H operates the operation part 53 of the management terminal 5, entering settings such as the print information to be printed on the front surface of the RFID tag T and entering instructions for producing the RFID tag T. Based on the production instructions and the control of the control circuit 202 of the apparatus 6 for producing a RFID tag and the CPU 51 of the management terminal 5, the print is printed by the print head 205 based on the entered setting information, and the access information is generated by the radio frequency circuit 201 and transmitted to the RFID circuit element To via the apparatus antenna 206. With this arrangement, the reading and writing of information with the IC circuit part 150 of the RFID circuit element To are performed and the RFID tag T comprising a corresponding tag ID is produced.

Using the tag information transmitting and receiving part 29 of the above-described configuration, the handheld reader 2 transmits a response request command (inquiry signal) that requests the RFID circuit element To of the RFID tag T that exists within the communication range 7 to transmit the respective tag IDs as a reply signal.

FIG. 4 is a block diagram illustrating an example of the functional configuration of the RFID circuit element To provided to the RFID tag T. Note that the configuration of the RFID circuit element To is common to the article tag Tb, the location tag Tp, and the user tag Tj.

In FIG. 4, the RFID circuit element To comprises the tag antenna 151 configured to transmit and receives signals in a non-contact manger with the reader antenna 23 of the handheld reader 2, and the IC circuit part 150 connected to this tag antenna 151, as described above.

The IC circuit part 150 comprises a rectification part 152 configured to rectify the interrogation wave received via the tag antenna 151, a power source part 153 configured to store the energy of the interrogation wave thus rectified by the rectification part 152 as a driving power source, a clock extraction part 154 configured to extract a clock signal from the interrogation wave thus received from the tag antenna 151 and supply the clock signal thus extracted to a control part 157, a memory part 155 configured to store a predetermined information signal, a modem part 156 connected to the tag antenna 151, and the control part 157 for controlling the operation of the RFID circuit element To via the memory part 155, the clock extraction part 154, the modem part 156, etc.

The modem part 156 demodulates communication signals from the reader antenna 23 of the handheld reader 2 received from the tag antenna 151, modulates a reply signal from the control part 157, and replies with a response wave (signal including a tag ID) from the tag antenna 151.

The clock extraction part 154 extracts the clock component from the received signal and extracts the clock to the control part 157, supplying the clock corresponding to the frequency of the clock component of the received signal to the control part 157.

The control part 157 executes basic control, such as interpreting a received signal demodulated by the modem part 156, generating a reply signal based on the information signal stored in the memory part 155, and returning the reply signal from the tag antenna 151 via the modem part 156.

The RFID circuit element To provided to the article tag Tb comprises an article RFID circuit element described in each of the claims, and the RFID circuit element To provided to the user tag Tj comprises a user RFID circuit element described in each of the claims.

Next, the article management table and user management table stored in the large-capacity storage device 43 of the database 4 in the example of the present embodiment will be described.

FIG. 5A is a diagram conceptually showing an example of an article management table, and FIG. 5B is a diagram conceptually shown an example of a user management table. The article management table and the user management table contain information stored and held in the large-capacity storage device 43 of the database 4, and respectively manage various information related to the printer B and the user H.

In FIG. 5A, the article management table stores in association the article name (article information) of each printer B (the printer of the example shown in FIG. 1), the article tag ID (stored in the RFID circuit element To of the article tag Tb), which is the unit identification information of that printer B, the storage location tag ID (stored in the RFID circuit element To of the location tag Tp), which is the identification information of the storage shelf 100 set as the storage location of the printer B, the management status that indicates whether the printer B is in a stored state (management status information; a state of being placed on the storage shelf 100) or in a taken-out state (a state of being taken out from the storage shelf 100), and, in a case where the management status of the printer B indicates a taken-out state, the take-out user tag ID (stored in the RFID circuit element To of the user tag Tj), which is the identification information of the user H who has taken out the printer B.

In FIG. 5B, the user management table stores in association the user tag ID (stored in the user tag Tj), which is the identification information of each user H, the affiliated department of the user H, the name of the user H, and take-out permissibility, which indicates whether or not the user H is permitted to take out the printer B.

The data structure is designed so as to make it possible to easily distinguish the article tag ID, the location tag ID, and the user tag ID by conducting comparisons using a portion of data of a predetermined location (the contents of the first 4 bits in the example shown) rather than by conducting comparisons using the respective entire data contents.

FIG. 6 is a flowchart showing the control procedure executed by the CPU 24 of the handheld reader 2. In this example, the flow starts (START position) after power ON.

First, in step S100, user collation processing (refer to FIG. 7 described later) is performed to get the various information of the user H who is operating the handheld reader 2.

Subsequently, the flow proceeds to step S5 where the decision is made as to whether or not valid information was acquired in the user collation processing of the step S100, i.e., whether or not the user H operating the handheld reader 2 at that moment is a user properly registered in the user management table of database 4. In a case where valid information was not acquired, the decision made is "No," i.e., the handheld reader 2 is regarded as being operated by a user having an invalid user tag ID, and an error indicating so is displayed on the display part 27 in step S10, and the flow ends. On the other hand, in a case where valid information is acquired, the decision made is "Yes," i.e., the handheld reader 2 is regarded as being operated by a user properly registered in the user management able, and the flow proceeds to the next step S20.

In step S20, the processing that can be performed using the handheld reader 2 is displayed correspondingly with the operations of the operation part 26 for executing each on the display part 27 (not shown), and the user H is prompted to input a processing selection via the operation part 26 (execution processing selection input display). In this example, the processing that can be executed by the handheld reader 2 includes search processing for finding the printer B wanted by the user H, take-out processing for taking out the printer B from the storage location, return processing for returning the taken-out printer B to the storage location, and end processing for ending operation of the handheld reader 2.

Subsequently, the flow proceeds to step S25 where the decision is made as to whether or not the user H has selected search processing in response to the display of the step S20. In a case where the user H has selected search processing, the decision made is "Yes" and the flow proceeds to step S200.

In step S200, the user H consecutively scans the respective article tag IDs of the printers B stored on the storage shelf 100 using the handheld reader 2, executing search processing (refer to FIG. 8 described later) that performs a search based on notification of detection of the article tag ID of the printer B specified as the search target (the managed article that is the search target). After this search processing is performed, the flow proceeds to step S30.

In step S30, a display is shown that prompts operation input whereby the user confirms an instruction indicating whether or not the found printer B is to be actually taken out, and the flow proceeds to step S35.

In step S35, the decision is made as to whether or not the user H has performed an operation that instructs printer B take-out in response to the display of the step S30. Here, in a case where the search of the search processing of the step S200 has ended in failure, or in a case where the search conducted was for confirmation of storage only, and an instruction operation for printer B take-out was not performed, the decision made is "No" and the flow returns to step S20 where the same procedure is repeated. On the other hand, in a case where an instruction operation for printer B take-out is performed, the decision made is "Yes" and the flow proceeds to the next step S37.

In step S37, reference is made to the take-out permissibility item within the information acquired in the user collation processing of the step S100, and a decision is made as to whether or not the user is permitted to take out the printer B. In a case where take-out permissibility is "Not permitted," the decision made is "No," an error indicating so is displayed on the display part 27 in step S10, and the flow ends. On the other hand, in a case where take-out permissibility is "Permitted," the decision made is "Yes," the take-out processing (details described later) for taking out the printer B from the storage location is performed in the next step S300, and the flow subsequently returns to step S20 where the same procedure is repeated.

On the other hand, in a case where the user H did not select search processing in the step S20, the decision made in the step S25 is "No" and the flow proceeds to step S40.

In step S40, the decision is made as to whether or not the user H has selected take-out processing in response to the display of the step S20. In a case where the user H has selected take-out processing, the decision made is "Yes," i.e., the target printer B is regarded as found even without performing search processing and therefore is to be taken out as is, and the take-out processing of the step S300 is performed. On the other hand, in a case where the user H has not selected take-out processing, the decision made in step S40 is "No" and the flow proceeds to step S45.

In step S45, the decision is made as to whether or not the user H has selected return processing in response to the display of the step S20. In a case where the user H has selected return processing, the decision made is "Yes," the return processing (details described later) of step S400 is performed, and subsequently the flow returns to step S20 where the same procedure is repeated. On the other hand, in a case where the user H has not selected return processing, the decision made is "No" and the flow proceeds to step S50.

In step S50, the decision is made as to whether or not the user H has selected end processing in response to the display of the step S20. In a case where the user H has selected end processing, the decision made is "Yes" and the flow ends. On the other hand, in a case where the user H has not selected end processing, the decision made is "No" and the flow returns to step S20 where the same procedure is repeated.

FIG. 7 is a flowchart which shows the detailed procedure of the user collation processing executed in step S100 shown in FIG. 6.

In FIG. 7, first in step S105, a control signal is outputted to the aforementioned transmission circuit 212, and a response request command signal for scanning the tag ID is transmitted. That is, the transmission circuit 212 generates an interrogation wave (the response request command signal) for getting the tag ID stored in the RFID circuit element To of the RFID tag T by performing predetermined modulation. Then, this response request command signal is transmitted to the RFID circuit element To of the RFID tag T that exists within the communication range 7 via the reader antenna 23.

Subsequently, in step S110, the reply signal (reply signal including the tag ID) transmitted from the RFID circuit element To of the RFID tag T in response to the response request command signal is received via the reader antenna 23 and incorporated via the reception circuit 213.

Subsequently, the flow proceeds to step S115 where the decision is made as to whether or not the reply signal was received in the step S110. In a case where the decision is made that the reply signal has not been received, the decision made is "No" and the flow returns to step S105 where the same procedure is repeated. On the other hand, in a case where the reply signal has been received, the decision made is "Yes" and the flow proceeds to step S120.

In step S120, a decision is made as to whether or not the tag ID included in the received reply signal is an article tag ID, i.e., whether or not the RFID tag T that exists in the communication range 7 of the handheld reader 2 is a user tag Tj. In this example, this decision is easily made based on the data contents (the contents of the first four bits in the example shown in FIG. 5) of a predetermined section of the tag ID as described above.

In a case where the tag ID is not a user tag ID, the decision made is "No," i.e., the user H is regarded as mistakenly having scanned a tag ID from a RFID tag T of another type before scanning the user tag ID from the user tag Tj that is in his/her possession. On the other hand, in a case where the received tag ID is a user tag ID, the decision made is "Yes," i.e., the user H operating the handheld reader 2 is regarded as having scanned his/her own user tag ID, and the flow proceeds to the next step S125.

In step S125, the database 4 is accessed via a radio network or wired network, the various information corresponding to the scanned user tag ID is acquired from the user management table recorded in the large-capacity storage device, and the flow ends, returning to step S5 of FIG. 6.

FIG. 8 is a flowchart which shows the detailed procedure of the search processing executed in step S200 shown in FIG. 6.

In FIG. 8, first in step S205, a display is shown that prompts the user H to perform an input operation via the operation part 26 to specify the printer B (denoted as the search target article in the figure) that is the search target. In this example, the user H operates the management terminal 5 in advance to search for the article tag ID corresponding to the printer B that is the search target from the article management table of the database 4. When the user H responds to the display of step S205 and enters the article tag ID so as to specify the printer B that is the search target (described later in detail in FIG. 11), the decision made in step S206 is "Yes" and the flow proceeds to step S210. Note that the user H may also specify the printer B that is the search target by operating the handheld reader 2, entering various search conditions and searching the article management table of the database 4, for example.

In step S210, the various information corresponding to the printer B that is the search target specified in the step S205, is acquired from the article management table of the database 4.

Subsequently, in step S215, the decision is made as to whether or not the management status in the information acquired in the step S210 indicates a stored state, that is, whether or not the printer B that is the search target has not been taken out by another user H, but rather is currently stored in a specific storage location. In a case where the management status indicates a taken-out state, the decision made in step S215 is "No," i.e., the printer B that is the search target is regarded as not found, an error display indicating so is displayed on the display part 27 in step S220, and the flow ends.

On the other hand, in a case where the management status indicates a stored state, the decision made in step S215 is "Yes," the time contents of the timer 32 are reset in the next step S225, the time is started (from 0), and the flow proceeds to step S230.

In step S230 and the next step S235, a response request command signal (unconditional information acquisition command not specifying a tag ID) is transmitted to the RFID circuit element To of the RFID tag T that exists within the communication range of the reader antenna 23, and the reply signal corresponding to this is imported from the RFID circuit element To of the RFID tag T.

Subsequently, the flow proceeds to step S240 where the decision is made as to whether or not a reply signal was received in the step S235. In a case where a reply signal has not been received, the decision made in step S240 is "N" and the flow proceeds to step S245.

In step S245, the time contents of the timer 32 that has been measuring the time since step S225 are displayed so as to show the amount of elapsed time since the start of the search to the user H.

Subsequently, the flow proceeds to step S250 where the decision is made as to whether or not the user H performed an instruction operation for ending the search via the operation part 26. In a case where an end operation was performed, the decision made is "Yes," i.e., although the printer B that is the search target has not been found, the user H is regarded as having referred to the elapsed time of the search process and having decided to stop the search, and the flow ends as is. On the other hand, in a case where an end operation has not been performed, the decision made in step S250 is "No" and the flow proceeds to step S255.

In step S255, the decision is made as to whether or not the time contents of the timer 32 that has measured time since step S225 exceed a predetermined time period (a predetermined threshold value) This step is for forcibly stopping a search when the search processing has taken too much time. The predetermined time period that serves as standard is set in proportion to the number of printers B stored in the same storage location, for example, to a time period considered sufficient for conducting the search. In a case where the time contents of the timer 32 exceed the predetermined time period, the decision made in step S255 is "Yes," an error display indicating so is displayed on the display part 27 in step S220, and the flow ends. On the other hand, in a case where the time contents of timer 32 do not exceed the predetermined time, the decision made in step S255 is "No," the flow returns to step S230, and the same procedure is repeated.

On the other hand, in a case where a reply signal has been received in the step S235, the decision made in the step S240 is "Yes" and the flow proceeds to step S260.

In step S260, a control signal is outputted to the vibrating part 30 so as to vibrate the housing of the handheld reader 2 (=make a notification using a first form) and make a sensory notification (primary notification) to the user H holding the handheld reader 2 indicating that radio communication with the RFID tag T was performed successfully (=confirming that there is a RFID tag T, although the actual unit has not yet been identified at the moment).

Subsequently, the flow proceeds to step S265 where the decision is made as to whether or not the tag ID included in the received reply signal in the step S235 is the article tag ID (denoted as the target tag ID in the figure) corresponding to the printer B that is the search target, i.e., whether or not the received tag ID matches the article tag ID acquired in the step S210. In a case where the received tag ID is the article tag ID of the printer B that is the search target, the decision made is "Yes," i.e., the article tag Tb that is the search target at that moment is regarded as existing within the communication range 7 of the reader antenna 23 (positioned on a line extended in the longitudinal direction from the housing of the handheld reader 2 in FIG. 1).

In step S270, the control signal is outputted to the sound generating part 31 so as to produce a notification sound (=notification in a second form), and the user H is auditorily notified that the printer B that is the search target (the article tag Tb affixed thereto) has been found (secondary notification). This process terminates here.

On the other hand, in a case where the tag ID received in the step S235 is not the article tag ID of the printer B that is the search target, the decision made in the step S265 is "No," the flow proceeds to step S245, the amount of time that has elapsed since the start of search processing is displayed, and the same procedure is repeated.

FIG. 9 is a flowchart which shows the detailed procedure of the take-out processing executed in step S300 shown in FIG. 6.

In FIG. 9, the article tag ID is first scanned in step S305, step S310, step S315, and step S320, based on the same control respectively performed in the procedures of step S105, step S110, step S115, and step S120 of the flow in FIG. 7. The scanned article tag ID is regarded as the article tag ID corresponding to the printer B that the user H is attempting to take out.

Subsequently, the flow proceeds to step S325, and a display is shown that prompts operation input whereby the user H confirms the final decision as to whether or not the he/she is actually going to take out the printer B corresponding to the article tag ID.

Subsequently, in step S330, the decision is made as to whether or not the user H performed an operation that finalizes the take-out of printer B in response to the display of the step S325. In a case where the user H performed an operation that finalized take-out of the printer B, the decision made in step S330 is "Yes" and, in step S335, the database 4 is accessed and an instruction is issued to change the management status corresponding to the printer B that is to be taken out to a taken-out state as well as the corresponding take-out user tag ID to the user tag ID of the user H (the user tag ID scanned in the user collation processing of the step S100) in the article management table. This process then terminates here.

On the other hand, in a case where the an operation that finalizes the take-out of printer B is not performed by the user H, the decision made in step S330 is "No," i.e., an article tag ID other than the article tag ID of the printer B to be taken out is regarded as having been mistakenly scanned, and the flow proceeds to step S340.

In step S340, the decision is made as to whether or not the user H has performed an instruction operation for ending the take-out processing via the operation part 26. In a case where an end operation has been performed, the decision made is "Yes," i.e., the printer B that is the search target is regarded as having been found but not taken out, and the flow ends. On the other hand, in a case where an end operation has not been performed, the decision made in step S340 is "No" and the flow returns to the next step S305 where the same procedure is repeated.

FIG. 10 is a flowchart which shows the detailed procedure of the return processing executed in step S400 shown in FIG. 6.

In FIG. 10, first the article tag ID is scanned in step S405, step S410, step S412, and step S420, based on the same control respectively performed in the procedures of step S105, step S110, step S115, and step S120 of the flow in FIG. 7. The scanned article tag ID is regarded as the article tag ID corresponding to the printer B that the user H is attempting to return.

Subsequently, the location tag ID is scanned in the procedures of step S425, step S430, step S435, and step S440 based on the same control as that performed in the step S405, step S410, step S412, and step S420. The scanned location tag ID is regarded as the location tag ID corresponding to the storage location (the storage shelf of the example shown in FIG. 1) where the user H is attempting to return the printer B.

Then, the flow proceeds to step S445 where a display is shown that prompts operation input whereby the user H provides final confirmation as to whether or not the printer B corresponding to the scanned article tag ID is to be actually returned to the storage location corresponding to the scanned location tag ID.

Subsequently, in step S450, the decision is made as to whether or not the user H has performed an operation confirming return of the printer B in response to the display of the step S445. In a case where the user H has performed a confirmation operation for returning the printer B, the decision made is "Yes" and, in step S455, the database 4 is accessed and an instruction is issued to change the management status corresponding to the printer B to be returned to a stored state and to delete the corresponding take-out user tag ID in the article management table. This process then terminates here.

On the other hand, in a case where the user H has not performed a confirmation operation for returning the printer B, the decision made in step S450 is "No," i.e., the printer B is regarded as having been taken out and brought back, but the return has been cancelled, and the flow ends as is.

FIG. 11 is a sequence diagram showing an example of the control operation and response when search processing and take-out processing are continually performed using the handheld reader 2 that performs the control procedure indicated in FIG. 6 to FIG. 10. FIG. 11 shows the time series changing from the top toward the bottom of the figure, and illustrates the procedures of the user H (handheld reader 2), the database 4, and the management terminal 5 in relation to this time series, describing the before and after relationship of these items in terms of time. Furthermore, in the example shown in FIG. 11, the user H operates the management terminal 5 in advance to search for the article tag ID corresponding to the printer B that is the search target in the article management table of the database 4, and specifies the printer B that is the search target by entering that article tag ID in search processing.

First, before starting the handheld reader 2 (note that after startup is also acceptable), the user H operates the management terminal 5 in step MR1 to specify the printer B that is the search target (by entering the article name, for example), and requests display of related information. As a result, the management terminal 5 accesses the database 4, searches for the specified printer B in the article management table, and requests corresponding information in step MT1. The database 4 that receives this searches for the information corresponding to the specified article in the article management table and responds to the management terminal 5, and the management terminal 5 gets the information (management status information acquisition portion) in step MD1. Then, the management terminal 5 that receives this displays the information received on the display part 4 in step MT2, enabling the user H to confirm the article tag ID (the article tag ID of the printer B that is the search target) that is included in that information.

Then, in step MR2, the user H scans the user tag ID from the user tag Tj (ID card) this is in his/her possession based on the user collation processing of the started handheld reader 2, and logs into the article management system 1 (note that the procedures for getting and determining the information from the database 4 performed at this time are omitted).

Subsequently, the user H selects search processing in step MR3 and enters the article tag ID displayed in the step MT2 by the management terminal 5 into the handheld reader 2 in the next step MR4 so as to specify the printer B that is the search target. Then, in step MR5, the user H consecutively orientates the communication range 7 of the handheld reader 2 toward the article tags Tb, and scans the respective article tag IDs. In a case where radio communication with the article tag Tb is successfully performed and the article tag ID is scanned, the vibrating part 30 vibrates (primary notification) in step MR6 in confirmation.

Then, in a case where the scanned article tag ID matches the article tag ID corresponding to the printer B that is the search target, a sound is generated (secondary notification) from the sound generating part 31 in step MR7, enabling the user H to confirm that the printer B that is the search target has been found. Until the printer B that is the search target is found, the scanning of the article tag ID is repeated.

In a case where the end operation of search processing is not performed and the printer B that is the search target is found within a predetermined period of time (in a case where the secondary notification is detected), the processing can be switched to take-out processing by selecting take-out processing in step MR8 as is (the procedure for determining take-out permissibility performed immediately after this step is omitted, and take-out is assumed as permitted). Then, the user H scans the article tag ID from the article tag Tb of the printer B to be taken out in step MR9 and performs an input operation that finalizes take-out in step MR10, thereby accessing the database 4 in the next step MR11 and requesting that the management status and take-out user tag ID in the article management table be changed.

The database 4 that receives this changes the management status corresponding to the article tag ID in the article management table to a taken-out state, and changes the corresponding take-out user tag ID to the user tag ID of the user H (the user tag ID scanned in the step MR2) in step MD2.

In this manner, the user H can find and take out the printer B using the handheld reader 2, and subsequently end the operation by selecting and entering end processing in step MR12.

FIG. 12 is a diagram showing a display example of the display part 54 of the management terminal 5 when the search is conducted in step MR1 of FIG. 11. This figure shows a window screen of an application where a pointing device such as a mouse is used in a so-called GUI (Graphical User Interface) environment to operate a cursor C on the screen and operations are performed by pressing applicable buttons and entering text information.

The application shown accesses the database 4 and search for various information in the article management table using the article name, storage status, and management status as search conditions. The operator (searcher) presses the Find button (search instructing device) with one or more of the search conditions specified so as to display the information of the printer B corresponding to the specified search conditions. Then, in the example shown, the operator presses a pull-down button 302B, which is located on the right end of the entry area (operation display device) of the article name search condition, thereby extending an entry area 302 downward and displaying in list format a history 302L of article names specified as a search condition in past searches. The operator can now place the cursor C on an item in this list so as to specify a search condition again (same holds true for the storage status and management status) In this manner, the management terminal 5 stores as operation input history the history of contents specified as search conditions in past searches in the memory 52 (or the storage device 55) of an operation history storage device.

FIG. 13 is a sequence diagram showing an example of the control operation and response when return processing is performed using the handheld reader 2 that performs the control procedure indicated in FIG. 6 to FIG. 10.

In FIG. 13, the user H in step HR1 scans the user tag ID from the user tag Tb (ID card) in his/her own possession based on the user collation processing of the handheld reader 2, and logs into the article management system 1.

Then, the user H selects return processing in step HR2, scans the article tag ID from the article tag Tb affixed to the printer B to be returned in step HR3, and scans the location tag ID from the location tag Tp affixed to the storage shelf 100 of the return destination in step HR4. Subsequently, the user H performs an input operation to confirm return in step HR5, and accesses the database 4 and requests that the management status and take-out user tag ID in the article management table be changed in the next step HR6.

The database 4 that receives this request changes the management status corresponding to the article tag ID to a stored state and deletes the corresponding take-out user tag ID in the article management table in step HD1.

In this manner, the user H can return the printer B using the handheld reader 2, and subsequently end the operation by selecting and entering end processing in step HR7.

In the above, the procedure of the step S230 in the flow of FIG. 8 constitutes a transmission processing portion, the procedure of step S235 constitutes a reception processing portion, the procedure of step S265 constitutes a collating portion, and the procedure of step S255 constitutes a transmission control portion described in each of the claims. Further, the procedure of step S11 of the flow of FIG. 7 constitutes a user identification information acquisition portion. The procedure of step S37 of the flow of FIG. 6 constitutes a user determining portion. And, the procedure of step S335 of the flow of FIG. 9 constitutes a take-out processing portion.

As described above, in the present embodiment, when the user H consecutively holds the handheld terminal 2 over a plurality of printers B so as to scan the article tag IDs, the handheld reader 2 makes a primary notification based on vibration when held over a printer B that is not the search target. Then, when the handheld reader 2 is held over the printer B that is the search target and the article tag ID is scanned, the handheld reader 2 makes a secondary notification based on sound generation, enabling the user H to find the target printer B. In a case where the article tag Tb provided in the printer B that is the search target fails for some reason or other, or in a case where the disposed orientation of the printer B or the surrounding radio wave environment, etc., causes communication difficulties, the handheld reader 2 does not make a primary notification nor a secondary notification since it cannot scan the article tag ID even when held over the printer B that is the search target. As a result, the user H recognizes that the article tag Tb of that printer B (the printer B that is the search target) is in a state of communication failure, making it possible for the user H to promptly check the printer B visually or by another method and in recognize that that printer is the printer B that is the search target.

This will now be described in greater detail below using a comparison example. That is, as a comparison example, consider a case where a handheld reader does not make the secondary notification as described above, but only a predetermined notification when a reply signal from the article tag Tb of the printer B that is the search target is received. In such a case, the user consecutively holds the handheld reader over the plurality of printers B, scanning the article tag IDs. Until the handheld reader is held over the printer B that is the search target, the handheld reader does not make any notification. Then when the handheld reader scans the article tag ID from the article tag Tb of the search target, the handheld reader makes the predetermined notification, thereby enabling the user to find the target printer B. Nevertheless, in a case where the article tag Tb provided to the printer B that is the search target fails for some reason or other, or in a case where the disposed orientation of the printer B (sometimes the printer B is oriented rearward or sideways, for example) or the surrounding radio wave environment causes difficulties in communication, information scanning is not performed even when the handheld reader is held over the printer B that is the search target, causing the predetermined notification not to be made. As a result, the user does not recognize that the printer is the printer B that is the search target. Further, in such a case, because the handheld reader does not make any notification when held over any of the printers B, in the end the user must find the printer B that is the search target by visually checking all printers B or by performing another method, resulting in a significant amount of labor.

In contrast, with the article management system 1 of the present embodiment, neither the primary notification nor the secondary notification is made when communication failure such as described above occurs. As a result, the user H checks the printer B (the printer having an article tag Tb in a state of communication failure), enabling recognition that the printer is the printer B that is the search target. As described above, according to the present embodiment, it is possible to reliably find the printer B that is the search target even in a case where communication failure occurs in the RFID tag T.

Further, particularly in the present embodiment, the form of notification changes between the primary notification based on vibration that is made when a reply signal is received from the plurality of article tags Tb, and the secondary notification based on sound that is made when the article tag Tb of the search target is found, thereby making it possible for the user H to easily understand, distinguish, and recognize the two. Note that the secondary notification based on sound is not limited to a simple sound such as a beep, but may be an artificial voice based on human speech such as the word "Found," for example.

Further, in particular in the present embodiment, the time contents of the timer 32 are displayed during search processing, making it possible for the user H to recognize the amount of elapsed time since the start of the search processing and, in a case where the search has taken too much time, take rational measures such as voluntarily stopping the search (and trying again the following day), etc. Particularly, in this example, in step S225 shown in FIG. 8, the search processing is stopped in a case where the time period of the timer 32 exceeds a predetermined period, making it possible for the user H to forcibly stop the processing in a case where the search has taken too much time. Furthermore, rather than displaying the time contents of the timer 32 as is, the remaining time that results when the time contents of the timer 32 are subtracted from the predetermined time may be displayed.

Further, particularly in the present embodiment, the user tag ID is scanned from the user tag Tj of the user H in user collation processing and the take-out permissibility information corresponding to that user tag ID is acquired from the database 4 so as to determine the permissibility of take-out of the printer B. With this arrangement, the range of use of the article management system 1 of the user H may be restricted in relation to take-out processing, making it possible to improve security. Note that while the range of use of the article management system 1 of the user H was restricted in terms of take-out processing only in the example of the present embodiment, range restrictions of the user H may be placed on search processing as well.

Further, particularly in the present embodiment, the management information in the article management table of the database 4 can be changed in take-out processing, making it possible for the user H to record in the database 4 his/her own take-out of the printer B that was found by his/her search.

Further, in a case where the user H conducts a search for the printer B, there is a high possibility that the user H is attempting to take out the printer B. Here, particularly in the present embodiment, the flow proceeds to step S30 after the search processing ends in step S200, and a confirmation display is shown on the display part 27 to check whether or not the printer B is to be taken out. With this arrangement, the user H can register the taken-out state in the database 4 by simply entering take-out on the confirmation display automatically shown after the search ends. As a result, when search take-out is performed, the amount of labor put into operation by the user H can be reduced, thereby improving user-friendliness.

Further, in particularly in the present embodiment, when the user H searches for the target printer B, the user H specifies search conditions such as the article name of the printer B using the operation part 53 of the management terminal 5 by data entry, etc., and the search is conducted with the entries displayed on the display part 54. With this arrangement, the information of the management status of the printer B (whether the printer B is stored or taken out) can be acquired from the database 4 and displayed. In addition, acquisition of the article tag ID of the article tag Tb of the printer B makes it possible to conduct the search with the handheld reader 2 using that acquired article tag ID (if the printer B is stored).

At this time, the memory 52 or the storage device 55 of the management terminal 5 stores the search conditions specified in the past, and the screen is set so that the search conditions (article names, etc.) of past search condition entries are first displayed in the search condition entry area 302. With this arrangement, the next time or any time thereafter an attempt is made to once again search for the same printer B, the database 4 can be searched and the management status information can be acquired by simply (checking the search conditions already displayed in the history 302L of the search condition entry area 302 and) inputting an instruction to execute the search, eliminating the need to enter the search conditions such as the article name one by one using the operation part 53. In this manner, the labor involved in operation input when a search is repeated for the same printer B can be reduced, making it possible to improve user-friendliness.

Note that the arrow shown in each figure, such as FIG. 3 and FIG. 4, in the above denotes an example of signal flow, but the signal flow direction is not limited thereto.

Also note that the present invention is not limited to the procedures shown in the flowcharts of FIG. 6, FIG. 7, FIG. 8, FIG. 9, FIG. 11, FIG. 13, etc., and procedure additions and deletions as well as sequence changes may be made without departing from the spirit and scope of the invention.

Additionally, other than those previously described, approaches according to the respective embodiments and exemplary modifications may be utilized in combination as appropriate.

Note that various modifications which are not described in particular can be made according to the present invention without departing from the spirit and scope of the invention.

What is claimed is:
1. An article management system comprising:
a portable apparatus for communicating with a RFID tag that has an apparatus antenna for transmitting and receiving information with a RFID circuit element comprising an IC circuit part configured to store information and a tag antenna configured to transmit and receive information, and searches for a plurality of article RFID circuit elements respectively provided to a plurality of managed articles; and a database connected by a wired or radio communication line to said portable apparatus for communicating with a RFID tag; wherein:

said database stores in association article information of said managed article, and tag identification information of said article RFID circuit element corresponding to said managed article;

said portable apparatus for communicating with a RFID tag includes:

a transmission processing portion configured to generate an unconditional information acquisition instruction for unconditionally acquiring information stored in said IC circuit part and to transmit the unconditional information acquisition instruction via said apparatus antenna;

a reception processing portion configured to receive a reply signal returned from said article RFID circuit element via said apparatus antenna in response to said unconditional information acquisition instruction;

a primary notifying device configured to make a notification in a first form to an operator when said reply signal is received by said reception processing portion;

a collating portion configured to collate whether or not the tag identification information of said article RFID circuit element included in said reply signal received by said reception processing portion matches the tag identification information of said article RFID circuit element provided to said managed article that is the search target of said operator;

a secondary notifying device configured to make a notification to said operator in a second form that differs from said first form when the collation results of said tag identification information by said collating portion indicate a match;

a timer device configured to measure the elapsed time since a first transmission of said unconditional information acquisition instruction by said transmission processing portion; and a time information display device configured to display time information corresponding to said elapsed time measured by said time device to said operator.

2. The article management system according to claim 1, wherein:

said primary notifying device of said portable apparatus for communicating with a RFID tag is a vibrating notifying device configured to make a notification to said operator based on vibration as said first form; and said secondary notifying device of said portable apparatus for communicating with a RFID tag is a sound notifying device configured to make a notification to said operator based on sound as said second form.

3. The article management system according to claim 1, wherein:

said portable apparatus for communication with a RFID tag further includes a transmission control portion configured to stop transmission of said unconditional information acquisition instruction from said transmission processing portion when said elapsed time measured by said timer device is greater than or equal to a predetermined threshold value.

4. The article management system according to claim 1, wherein:

said database stores user identification information related to a user permitted take-out of said managed article; and said portable apparatus for communicating with a RFID tag further includes:

a user identification information acquisition portion configured to acquire said user identification information from said RFID circuit element for a user possessed by said operator via said apparatus antenna; and a user determining portion configured to access said database and determine whether or not said operator is a user who is permitted take-out of said managed article, based on said user identification information acquired by said user identification information acquisition portion.

5. The article management system according to claim 4, wherein:

said database stores in association said article information, said tag identification information, and management status information of said managed article; and said portable apparatus for communicating with a RFID tag further includes a take-out processing portion configured to change said management status information of the managed article stored in said database to a taken-out state in a case where said operator, who has been determined as take-out permitted by said user determining portion after the collation results of said tag identification information by said collating portion indicate a match, inputs an intention to take out said managed object.

6. The article management system according to claim 5, wherein:

said portable apparatus for communicating with a RFID tag further includes a confirmation display device configured to present a confirmation display to said operator for confirming whether or not the corresponding managed article is to be taken out, in a case where the collation results of said tag identification information by said collating portion indicate a match; and said take-out processing portion changes said management status information to said taken-out state in the case where said operator inputs said intention to take out in response to said confirmation display by said confirmation display device.

7. The article management system according to claim 4, further comprising a search terminal connected by a wired or radio communication line to said database, wherein:

said search terminal includes:

an operation device configured to enable a searcher to execute operation input of said article information of said managed article;

an operation display device configured to display said entered article information in accordance with said operation input at said operation device;

a search instructing device for said searcher to execute instruction input for searching said database based on said article information, with said article information displayed on said operation display device;

a management status information acquisition portion configured to access said database and acquire said management status information of said managed article for which said article information is displayed on said operation display device, based on said instruction input at said search instructing device; and an operation history storage device configured to store said operation input history of said searcher; and said operation display device first displays said article information of past operation inputs based on the stored contents of said operation history storage device.

8. A portable apparatus for communicating with a RFID tag that has an apparatus antenna for transmitting and receiving information with a RFID circuit element comprising an IC circuit part configured to store information and a tag antenna configured to transmit and receive information, and searches for said article RFID circuit element provided to a managed article, comprising:
- a transmission processing portion configured to generate an unconditional information acquisition instruction for unconditionally acquiring information stored in said IC circuit part and to transmit the unconditional information acquisition instruction via said apparatus antenna;
- a reception processing portion configured to receive a reply signal returned from said article RFID circuit element via said apparatus antenna in response to said unconditional information acquisition instruction;
- a primary notifying device configured to make a notification in a first form to an operator when said reply signal is received by said reception processing portion;
- a collating portion configured to collate whether or not the tag identification information of said article RFID circuit element included in said reply signal received by said reception processing portion matches the tag identification information of said article RFID circuit element provided to said managed article that is the search target of said operator;
- a secondary notifying device configured to make a notification to said operator in a second form that differs from said first form when the collation results of said tag identification information by said collating portion indicate a match;
- a timer device configured to measure the elapsed time since a first transmission of said unconditional information acquisition instruction by said transmission processing portion; and
- a time information display device configured to display time information corresponding to said elapsed time measured by said timer device to said operator.

* * * * *